(12) United States Patent
Goshima

(10) Patent No.: US 10,570,002 B2
(45) Date of Patent: Feb. 25, 2020

(54) FORKLIFT

(71) Applicant: SHIMADZU CORPORATION, Kyoto (JP)

(72) Inventor: Daisuke Goshima, Kyoto (JP)

(73) Assignee: SHIMADZU CORPORATION, Kyoto (JP)

( * ) Notice: Subject to any disclaimer, the term of this patent is extended or adjusted under 35 U.S.C. 154(b) by 113 days.

(21) Appl. No.: 15/896,059

(22) Filed: Feb. 14, 2018

(65) Prior Publication Data

US 2018/0229989 A1  Aug. 16, 2018

(30) Foreign Application Priority Data

Feb. 16, 2017 (JP) ................. 2017-027159

(51) Int. Cl.
  *B66F 17/00* (2006.01)
  *B62D 6/00* (2006.01)
  *B66F 9/075* (2006.01)
  *G05D 13/62* (2006.01)

(52) U.S. Cl.
  CPC ............ *B66F 17/003* (2013.01); *B62D 6/008* (2013.01); *B66F 9/07568* (2013.01); *B66F 9/07572* (2013.01); *G05D 13/62* (2013.01)

(58) Field of Classification Search
  CPC ................ B66F 17/003; B66F 9/07568; B66F 9/07572; B62D 6/008; G05D 13/62
  See application file for complete search history.

(56) References Cited

U.S. PATENT DOCUMENTS

| 7,207,411 | B2 * | 4/2007 | Duits ............... | B62D 5/005 |
| | | | | 180/402 |
| 8,775,026 | B2 * | 7/2014 | Futahashi .......... | B66F 9/07568 |
| | | | | 701/41 |
| 8,855,859 | B2 * | 10/2014 | Hayama ............. | B62D 5/006 |
| | | | | 180/443 |
| 2007/0205037 | A1 | 9/2007 | Miyajima et al. | |
| 2016/0368493 | A1 * | 12/2016 | Driscall .............. | B60W 30/143 |

FOREIGN PATENT DOCUMENTS

| JP | H10-287252 | 10/1998 |
| JP | 2007-230460 | 9/2007 |

* cited by examiner

*Primary Examiner* — Laura Freedman
(74) *Attorney, Agent, or Firm* — JCIPRNET

(57) ABSTRACT

Provided is a forklift capable of recognizing an approximate weight of an object to be conveyed supported by a fork without adding special parts. A control unit includes a storage unit which stores load/time information indicating a relationship between a delay time required for an angle of rear wheels to reach an angle corresponding to an angle of the steering wheel and a weight of the object to be conveyed supported by the fork at that time, a delay time detection unit which detects the delay time required for a steering angle of the rear wheels to reach the angle corresponding to the angle of the steering wheel, and a weight identifying unit which identifies the weight of the object to be conveyed supported by the fork on the basis of the delay time detected by the delay time detection unit and the load/time information stored in the storage unit.

12 Claims, 4 Drawing Sheets

FORKLIFT

CROSS-REFERENCE TO RELATED APPLICATION

This application claims the priority benefit of Japan application serial no. 2017-027159, filed on Feb. 16, 2017. The entirety of the above-mentioned patent application is hereby incorporated by reference herein and made a part of this specification.

BACKGROUND

Technical Field

The present disclosure relates to a forklift including a main body having steered wheels, a steering wheel for operating the steered wheels, and a fork which is raised and lowered with respect to the main body in a state of supporting an object to be conveyed, and particularly relates to a forklift having a steer-by-wire type steering system.

Description of Related Art

In such a forklift, a full-hydraulic power steering device equipped with an orbit roll, which steers steered wheels by supplying hydraulic oil in an amount of oil corresponding to an operation amount of the steering to a steering cylinder, has been used (see Patent Document 1).

In contrast, in recent years, as a steering system of a forklift, electric hydraulic pressure power steering of a steer-by-wire system in which a steering operation is detected by an electrical signal which is input to a control device and then a voltage supplied to a direct current (DC) motor for providing power to a hydraulic pressure supply source is controlled by the control device has continued to be employed (see Patent Document 2).

[Patent Document 1] Japanese Unexamined Patent Application, First Publication No H10-287252

[Patent Document 2] Japanese Unexamined Patent Application, First Publication No 2007-230460

SUMMARY

In such a forklift, it is preferable to recognize an approximate weight of an object to be conveyed supported by a fork. Therefore, conventionally, a load sensor mechanism has been disposed in a forklift for the purpose of measuring a weight of an object to be conveyed supported by the fork. As a result, a problem occurs in which the number of parts increases and the device cost increases.

The present disclosure has been made to solve the problems described above, and it is an object of the present disclosure to provide a forklift employing a steer-by-wire system which can recognize an approximate weight of an object to be conveyed supported by a fork without adding special parts.

In a forklift with a steer-by-wire system including a main body having steered wheels, a steering wheel which operates the steered wheels, a fork which is raised and lowered with respect to the main body in a state of supporting an object to be conveyed, a steering wheel angle sensor which detects an angle of the steering wheel, a steered wheel angle sensor which detects an angle of the steered wheels, and a steered wheel angle control mechanism which changes the angle of the steered wheels so that the angle of the steering wheel detected by the steering wheel angle sensor and the angle of the steered wheels detected by the steered wheel angle sensor correspond to each other, the forklift according to a first aspect of the present disclosure includes a storage unit which stores load/time information indicating a relationship between a delay time required for the angle of the steered wheels detected by the steered wheel angle sensor to reach an angle corresponding to the angle of the steering wheel detected by the steering wheel angle sensor and a weight of the object to be conveyed supported by the fork at that time, a delay time detection unit which detects the delay time required for the angle of the steered wheels detected by the steered wheel angle sensor to reach the angle corresponding to the angle of the steering wheel detected by the steering wheel angle sensor when the steering wheel is operated, and a weight identifying unit which identifies the weight of the object to be conveyed supported by the fork on the basis of the delay time detected by the delay time detection unit and the load/time information stored in the storage unit.

A second aspect of the present disclosure, in the first aspect of the present disclosure, may further include a frictional coefficient measurement unit which measures a frictional coefficient of a road surface with which the steered wheels are in contact, and a load/time information correction unit which corrects the load/time information on the basis of the frictional coefficient measured by the frictional coefficient measurement unit.

According to a third aspect of the present disclosure, in the second aspect of the present disclosure, the frictional coefficient measurement unit may measure, when a stationary steering operation is executed, a frictional coefficient of the road surface with which the steered wheels are in contact on the basis of the delay time required for the angle of the steered wheels detected by the steered wheel angle sensor to reach a predetermined angle at the time of the stationary steering operation.

According to a fourth aspect of the present disclosure, in any one of the first to third aspects of the present disclosure, a rate of change in angle of the steered wheels with respect to an operation speed of the steering wheel may be changed on the basis of the weight of the object to be conveyed identified by the weight identifying unit.

According to a fifth aspect of the present disclosure, in any one of the first to fourth aspects of the present disclosure, a maximum speed may be limited on the basis of the weight of the object to be conveyed identified by the weight identifying unit.

According to the first aspect of the present disclosure, in the forklift employing the steer-by-wire system, it is possible to recognize an approximate weight of the object to be conveyed supported by the fork without adding special parts.

According to the second and third aspects of the present disclosure, it is possible to recognize an approximate weight of the object to be conveyed supported by the fork regardless of a frictional coefficient of the road surface even when the frictional coefficient of the road surface has changed.

According to the fourth aspect of the present disclosure, even in a forklift not having a load sensor mechanism, it is possible to operate the forklift more safely by recognizing an approximate weight of the object to be conveyed supported by the fork and changing the rate of change in angle of the steered wheels with respect to the operation speed of the steering wheel on the basis of the recognized weight.

According to the fifth aspect of the present disclosure, even in a forklift not having a load sensor mechanism, it is possible to operate the forklift more safely by recognizing an approximate weight of the object to be conveyed supported by the fork and limiting a maximum speed on the basis of the recognized weight.

DESCRIPTION OF THE EMBODIMENTS

Figure 1:
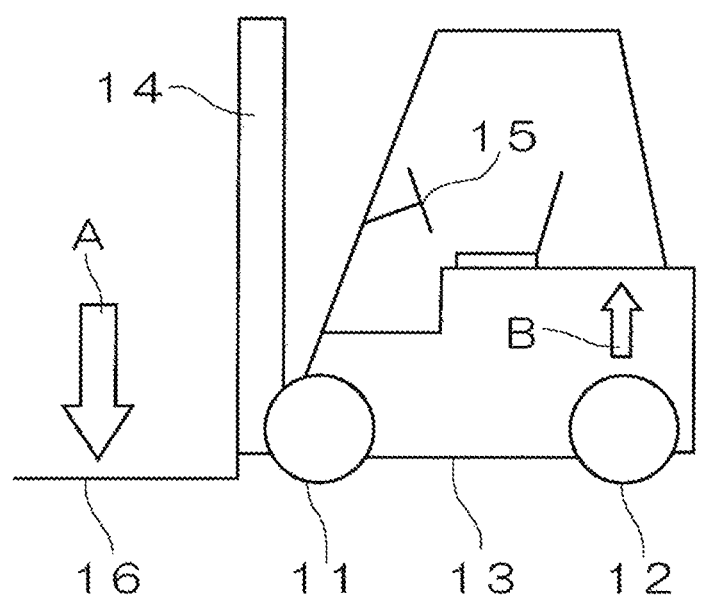
FIG. 1 is a schematic view of a forklift according to the present disclosure.

Hereinafter, embodiments of the present disclosure will be described on the basis of the accompanying drawings. FIG. 1 is a schematic view of a forklift according to the present disclosure.

This forklift with a steer-by-wire type steering system includes a main body 13 having front wheels 11 serving as traveling wheels and rear wheels 12 serving as steered wheels, a steering wheel 15 for operating the rear wheels 12 serving as the steered wheels, and a fork 16 which is raised and lowered with respect to a lifting mechanism 14 disposed on the main body 13 in a state of supporting an object to be conveyed. In the forklift, when a downward force indicated by an arrow A in FIG. 1 acts on the fork 16 due to a weight of an object to be conveyed supported by the fork 16, a load on the rear wheels 12 is reduced as indicated by an arrow B in FIG. 1. Then, a steering time of the rear wheels 12 is changed due to a change in the load on the rear wheels 12.

Figure 2:
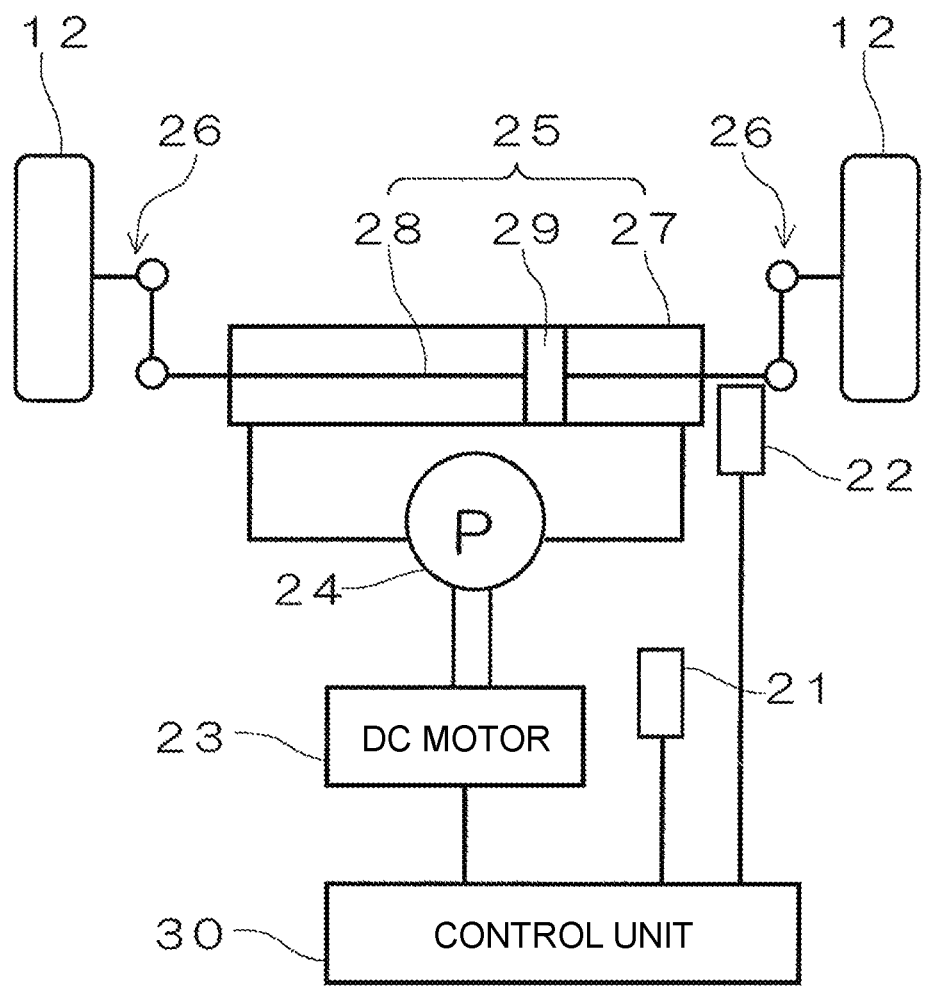
FIG. 2 is a block diagram illustrating a main drive system of the forklift according to the present disclosure.
Figure 3:
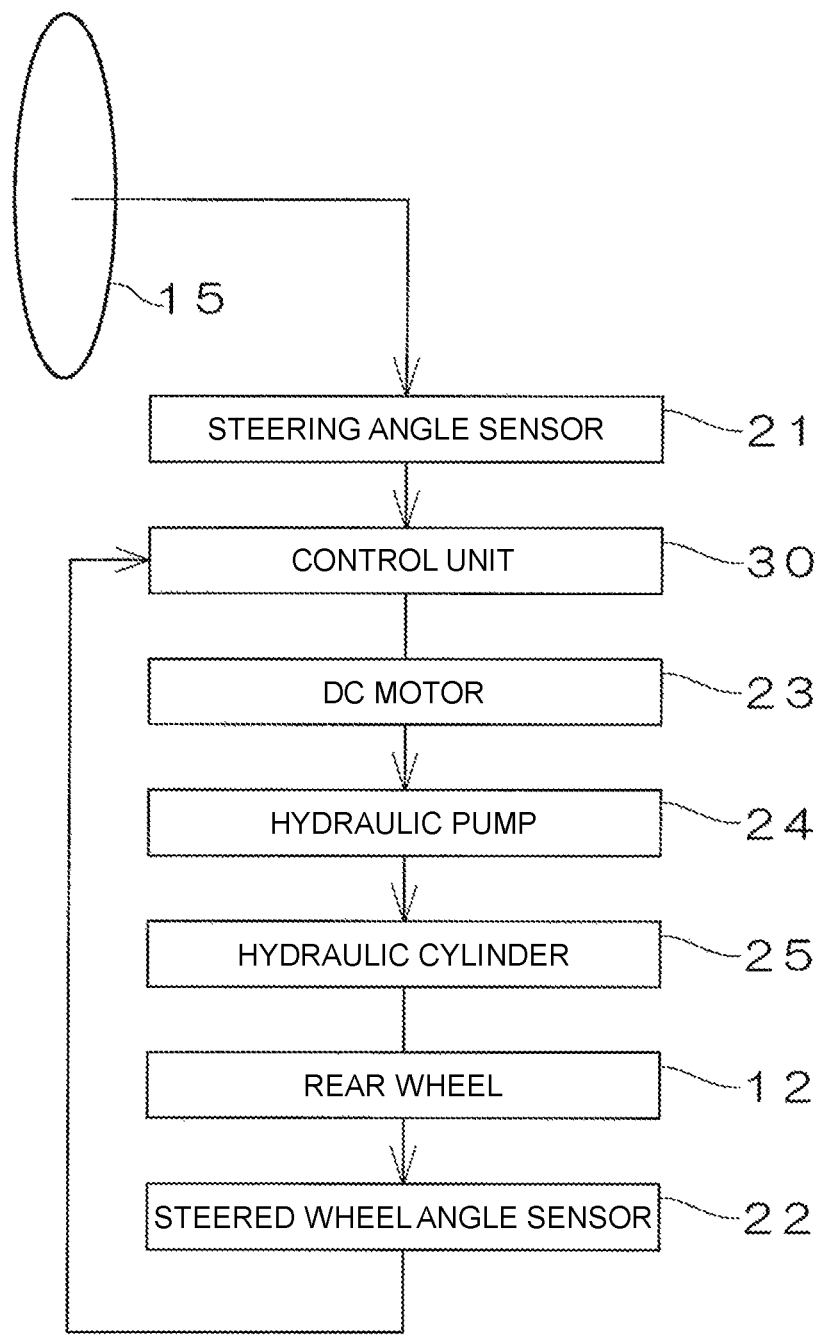
FIG. 3 is a block diagram illustrating a main control system of the forklift according to the present disclosure.

FIG. 2 is a block diagram illustrating a main drive system of the forklift according to the present disclosure. Also, FIG. 3 is a block diagram illustrating a main control system of the forklift according to the present disclosure.

This forklift includes a hydraulic cylinder 25 having a cylinder 27, a cylinder rod 28 and a piston 29 for changing a steering angle of a pair of rear wheels 12 serving as the steered wheels via a knuckle arm 26. Also, the forklift includes a hydraulic pump 24 for supplying hydraulic oil to the hydraulic cylinder 25, a direct current (DC) motor 23 which operates the hydraulic cylinder 25 by rotating the hydraulic pump 24 in a forward and backward direction, a steering wheel angle sensor 21 for detecting an angle of the steering wheel 15, and a steered wheel angle sensor 22 for detecting a steering angle of the rear wheels 12. Further, the forklift includes a control unit 30 as a steered wheel angle control mechanism for changing the steering angle of the rear wheels 12 so that the angle of the steering wheel 15 corresponds to the angle of the rear wheels 12 on the basis of signals from the steering wheel angle sensor 21 and the steered wheel angle sensor 22.

In this forklift, when the steering wheel 15 is operated and its angle is changed, the steering wheel angle sensor 21 detects this change and transmits a signal indicating the angle of the steering wheel 15 to the control unit 30. On the basis of the signal indicating the angle of the steering wheel 15 transmitted from the steering wheel angle sensor 21, the control unit 30 rotates the DC motor 23, drives the hydraulic pump 24 to cause the hydraulic cylinder 25 to operate, and changes the steering angle of the rear wheels 12. The steering angle of the rear wheels 12 is detected by the steered wheel angle sensor 22, and a signal indicating this steering angle is transmitted to the control unit 30. The control unit 30 changes the steering angle of the rear wheels 12 on the basis of the signal from the steering wheel angle sensor 21 and the steered wheel angle sensor 22 so that the angle of the steering wheel 15 and the angle of the rear wheels 12 correspond to each other.

Figure 4:
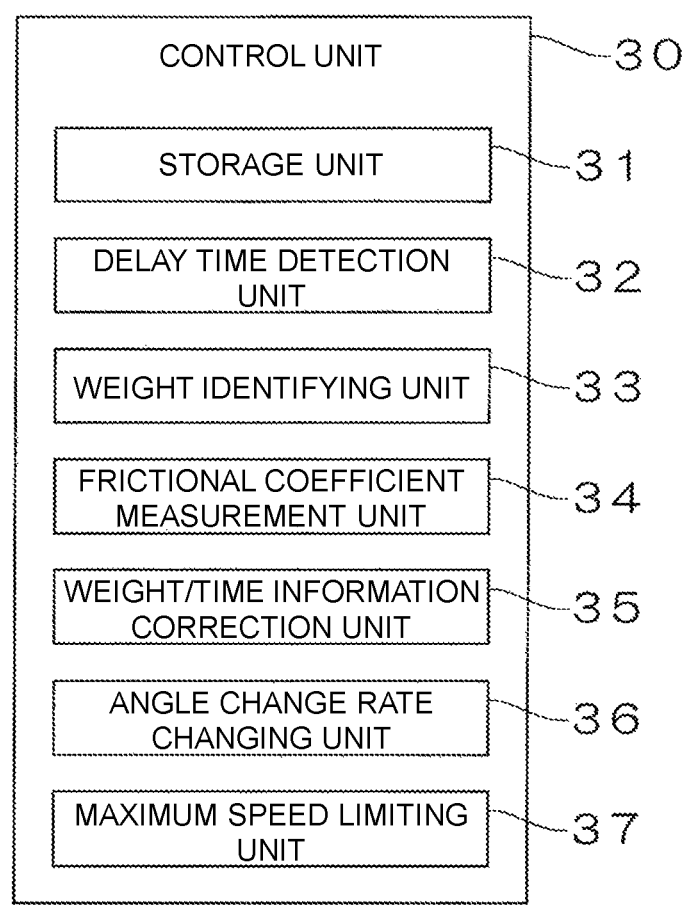
FIG. 4 is a block diagram illustrating a functional configuration of a control unit 30.

FIG. 4 is a block diagram illustrating a functional configuration of the control unit 30.

This control unit 30 includes a central processing unit (CPU) which executes a logical operation, a random-access memory (RAM) in which data and the like are temporarily stored at the time of control, and a read-only memory (ROM) in which operation programs necessary for controlling the device are stored, and functions as a processor.

This control unit 30 includes, as a functional configuration, a storage unit 31 which stores load/time information indicating a relationship between a delay time required for the angle of the rear wheels 12 detected by the steered wheel angle sensor 22 to reach an angle corresponding to the angle of the steering wheel 15 detected by the steering wheel angle sensor 21 and a weight of the object to be conveyed supported by the fork 16 at that time, a delay time detection unit 32 for detecting the delay time required for the steering angle of the rear wheels 12 detected by the steered wheel angle sensor 22 to reach the angle corresponding to the angle of the steering wheel 15 detected by the steering wheel angle sensor 21 when the steering wheel 15 is operated, and a weight identifying unit 33 which identifies the weight of the object to be conveyed supported by the fork 16 on the basis of the delay time detected by the delay time detection unit 32 and the load/time information stored in the storage unit 31.

Also, this control unit 30 includes, in a functional configuration thereof, a frictional coefficient measurement unit 34 which measures a frictional coefficient of a road surface with which the rear wheels 12 are in contact on the basis of the delay time required for the angle of the rear wheels 12 detected by the steered wheel angle sensor 22 to reach a predetermined angle when a stationary steering operation is executed, a load/time information correction unit 35 which corrects the load/time information on the basis of the frictional coefficient measured by the frictional coefficient measurement unit 34, an angle change rate changing unit 36 which changes a rate of change in angle of the rear wheels 12 with respect to an operation speed of the steering wheel 15 on the basis of the weight of the object to be conveyed identified by the weight identifying unit 33, and a maximum speed limiting unit 37 which limits a maximum speed on the basis of the weight of the object to be conveyed identified by the weight identifying unit 33.

When conveying an object to be conveyed in a forklift having a structure as described above, a frictional coefficient measuring operation for measuring a frictional coefficient of the road surface with which the rear wheels 12 are in contact is executed in a state in which traveling of the forklift is stopped. At this time, according to a command from the frictional coefficient measurement unit 34, a stationary steering operation for slightly changing the steering angle of the rear wheels 12 is executed in a short time. This stationary steering operation is executed not based on an operation by an operator of the forklift, but on the basis of a preset program. Then, at the time of this stationary steering operation, after the frictional coefficient measurement unit 34 issues a command to execute the stationary steering operation, the delay time required for the angle of the rear wheels 12 detected by the steered wheel angle sensor 22 to reach the predetermined angle is measured. This delay time is stored in the storage unit 31 as data representing a magnitude of the frictional coefficient of the road surface with which the rear wheels 12 are in contact.

Further, in a case in which a condition of the road surface with which the rear wheels 12 are in contact has not significantly changed and the frictional coefficient is within a predetermined range, the above-described frictional coefficient measurement operation may be omitted.

In this state, the fork 16 is raised and lowered to convey an object to be conveyed by the forklift and the object to be conveyed is supported by the fork 16. Then, in order to change a direction of the forklift, the operator of the forklift operates the steering wheel 15 to change its angle.

At this time, in a forklift with a steer-by-wire type steering system, a predetermined delay time occurs before the rear wheels 12 serving as steered wheels reach an angle corresponding to the operation angle of the steering wheel 15. As described above, when a downward force indicated by the arrow A in FIG. 1 acts on the fork 16, a load on the rear wheels 12 is reduced as indicated by the arrow B in FIG. 1. When the load of the object to be conveyed is large and the downward force indicated by the arrow A in FIG. 1 increases, the load on the rear wheels 12 indicated by the arrow B in FIG. 1 is reduced. When the load on the rear wheels 12 is reduced, the delay time until the rear wheels 12 serving as the steered wheels reach the angle corresponding to the operating angle of the steering wheel 15 decreases. On the other hand, when the load on the rear wheels 12 increases, the delay time also increases.

Therefore, when the operation of the steering wheel 15 is performed, the delay time detection unit 32 detects the delay time required for the steering angle of the rear wheels 12 detected by the steered wheel angle sensor 22 to reach the angle corresponding to the angle of the steering wheel 15 detected by the steering wheel angle sensor 21. Then, on the basis of the delay time detected by the delay time detection unit 32 and the load/time information stored in the storage unit 31 and indicating the relationship between the delay time and the weight of the object to be conveyed, the weight identifying unit 33 identifies the weight of the object to be conveyed supported by the fork 16. Thereby, it is possible to recognize an approximate weight of the object to be conveyed supported by the fork 16 of the forklift.

At this time, the load/time information correction unit 35 corrects the load/time information to be used when identifying the weight of the object to be conveyed on the basis of the data representing the magnitude of the frictional coefficient of the road surface with which the rear wheels 12 are in contact stored in the storage unit 31. Thereby, it is possible to recognize the weight of the object more accurately. Further, information indicating a relationship between the magnitude of the frictional coefficient and the corrected load/time information may be stored in the storage unit 31 as a table, and the load/time information correction unit 35 may correct the load/time information using this table.

In a case in which the forklift is operated after the weight of the object to be conveyed supported by the fork 16 is identified, the angle change rate changing unit 36 changes the rate of change in angle of the rear wheels 12 with respect to the operation speed of the steering wheel 15 on the basis of the weight of the object to be conveyed identified by the weight identifying unit 33. That is, in a case in which the weight of the object to be conveyed is large, when the steering wheel 15 is operated rapidly, there is a risk of the forklift being easily turned over or the like. Therefore, when the weight of the object to be conveyed is large, by decreasing the rate of change in angle of the rear wheels 12 with respect to the operation speed of the steering wheel 15, the operation of the steering wheel 15 is blunted, and thereby a sudden steering operation is prevented. Thereby, it is possible to operate the forklift more safely.

Also, when the forklift is operated after the weight of the object to be conveyed supported by the fork 16 is identified, the maximum speed limiting unit 37 limits a maximum speed of the forklift on the basis of the weight of the object to be conveyed identified by the weight identifying unit 33. That is, in a case in which the weight of the object to be conveyed is large, when the forklift travels at a high speed and the steering wheel 15 is operated rapidly, there is a risk of the forklift being easily turned over or the like. Therefore, when the weight of the object to be conveyed is large, it is possible to operate the forklift more safely by further reducing the maximum speed of the forklift.

As described above, according to the forklift of the present disclosure, it is possible to recognize the approximate weight of the object to be conveyed supported by the fork 16 by utilizing the delay time required for the steering angle of the rear wheels 12 to reach the angle corresponding to the angle of the steering wheel 15. Therefore, it is unnecessary to dispose a load sensor mechanism in the forklift for the purpose of measuring a weight of the object to be conveyed as in a conventional case.

In the above-described embodiment, among the front wheels 11 serving as the traveling wheels and the rear wheels 12 serving as the steered wheels, the approximate weight of the object to be conveyed supported by the fork 16 is recognized by utilizing the delay time required for the steering angle of the rear wheels 12 to reach the angle corresponding to the angle of the steering wheel 15.

In this type of forklift, generally, the rear wheels 12 are used as steered wheels for the purpose of reducing a minimum radius of rotation. However, in a forklift in which the front wheels 11 serve as steered wheels, there may be a configuration for recognizing an approximate weight of the object to be conveyed supported by the fork 16 by using a delay time required until the steering angle of the front wheels 11 reaches the angle corresponding to the angle of the steering wheel 15.

In the above-described embodiment, the configuration in which the frictional coefficient of the road surface with which the rear wheels 12 are in contact is measured by the stationary steering operation which changes the steering angle of the rear wheels 12 slightly in a short time is employed, but the frictional coefficient of the road surface may be optically measured, or the frictional coefficient of the road surface may be measured by another method such as a contact type sensor.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A forklift with a steer-by-wire system including a main body having steered wheels, a steering wheel which operates the steered wheels, a fork which is raised and lowered with respect to the main body in a state of supporting an object to be conveyed, a steering wheel angle sensor which detects an angle of the steering wheel, a steered wheel angle sensor which detects an angle of the steered wheels, and a steered wheel angle control mechanism which changes the angle of the steered wheels so that the angle of the steering wheel detected by the steering wheel angle sensor and the angle of the steered wheels detected by the steered wheel angle sensor correspond to each other, the forklift comprising:

a storage unit which stores load and time information indicating a relationship between a delay time required for the angle of the steered wheels detected by the steered wheel angle sensor to reach an angle corresponding to the angle of the steering wheel detected by the steering wheel angle sensor and a weight of the object to be conveyed supported by the fork at that time, a delay time detection unit which detects the delay time required for the angle of the steered wheels detected by the steered wheel angle sensor to reach the angle corresponding to the angle of the steering wheel detected by the steering wheel angle sensor when the steering wheel is operated, and a weight identifying unit which identifies the weight of the object to be conveyed supported by the fork on the basis of the delay time detected by the delay time detection unit and the load and time information stored in the storage unit.

2. The forklift according to claim 1, further comprising:

a frictional coefficient measurement unit which measures a frictional coefficient of a road surface with which the steered wheels are in contact, and a load and time information correction unit which corrects the load and time information on the basis of the frictional coefficient measured by the frictional coefficient measurement unit.

3. The forklift according to claim 2, wherein the frictional coefficient measurement unit measures, when a stationary steering operation is executed, a frictional coefficient of the road surface with which the steered wheels are in contact on the basis of the delay time required for the angle of the steered wheels detected by the steered wheel angle sensor to reach a predetermined angle at the time of the stationary steering operation.

4. The forklift according to claim 3, wherein a rate of change in angle of the steered wheels with respect to an operation speed of the steering wheel is changed on the basis of the weight of the object to be conveyed identified by the weight identifying unit.

5. The forklift according to claim 4, wherein a maximum speed is limited on the basis of the weight of the object to be conveyed identified by the weight identifying unit.

6. The forklift according to claim 3, wherein a maximum speed is limited on the basis of the weight of the object to be conveyed identified by the weight identifying unit.

7. The forklift according to claim 2, wherein a rate of change in angle of the steered wheels with respect to an operation speed of the steering wheel is changed on the basis of the weight of the object to be conveyed identified by the weight identifying unit.

8. The forklift according to claim 7, wherein a maximum speed is limited on the basis of the weight of the object to be conveyed identified by the weight identifying unit.

9. The forklift according to claim 2, wherein a maximum speed is limited on the basis of the weight of the object to be conveyed identified by the weight identifying unit.

10. The forklift according to claim 1, wherein a rate of change in angle of the steered wheels with respect to an operation speed of the steering wheel is changed on the basis of the weight of the object to be conveyed identified by the weight identifying unit.

11. The forklift according to claim 10, wherein a maximum speed is limited on the basis of the weight of the object to be conveyed identified by the weight identifying unit.

12. The forklift according to claim 1, wherein a maximum speed is limited on the basis of the weight of the object to be conveyed identified by the weight identifying unit.

* * * * *